(12) United States Patent
Grant

(10) Patent No.: US 6,812,782 B2
(45) Date of Patent: Nov. 2, 2004

(54) SWITCH MODE CONVERTER THAT ALLOWS 100% DUTY CYCLE ON GATE DRIVER

(75) Inventor: David A. Grant, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 79 days.

(21) Appl. No.: 10/280,743

(22) Filed: Oct. 25, 2002

(65) Prior Publication Data

US 2004/0080963 A1 Apr. 29, 2004

(51) Int. Cl.[7] ................................................. G06F 1/40
(52) U.S. Cl. ........................ 327/589; 323/282; 323/288
(58) Field of Search ............................... 323/283, 282, 323/288; 327/589

(56) References Cited

U.S. PATENT DOCUMENTS

| | | | |
|---|---|---|---|
| 5,138,200 A | * 8/1992 | Barsanti et al. | 326/88 |
| 5,373,435 A | * 12/1994 | Jayaraman et al. | 363/98 |
| 5,627,460 A | * 5/1997 | Bazinet et al. | 323/288 |
| 5,818,209 A | * 10/1998 | Masini et al. | 323/289 |
| 6,201,717 B1 | * 3/2001 | Grant | 363/60 |

* cited by examiner

*Primary Examiner*—Shawn Riley
(74) *Attorney, Agent, or Firm*—Alan K. Stewart; W. James Brady, III; Frederick J. Telecky, Jr.

(57) ABSTRACT

A switch mode converter uses the bootstrap capacitor 30 to operate all the way to 100% duty cycle by adding only a very small amount of low-area extra circuitry. The additional circuitry includes a charge pump 40 and a duty cycle detect device 42. When the duty cycle detect device 42 detects that the converter is attempting to operate in 100% duty cycle, the charge pump 40 provides additional charge to the bootstrap capacitor 30 to ensure that the 100% duty cycle is maintained.

6 Claims, 2 Drawing Sheets

SWITCH MODE CONVERTER THAT ALLOWS 100% DUTY CYCLE ON GATE DRIVER

FIELD OF THE INVENTION

This invention generally relates to electronic systems and in particular it relates to gate drivers for Buck mode converters.

BACKGROUND OF THE INVENTION

In conventional prior art buck mode (switch mode) converters employing MOS transistors as the high side and low side power switches, the high side switch is either a PMOS or NMOS. For a given design of buck mode converter, operating at some output voltage Vout, suppose that the input voltage drops. As the input voltage drops, the buck converter increases the duty cycle (D) (here, duty cycle D is defined as the on-time of the high side transistor multiplied by the frequency of switching of the high side transistor) Ultimately, there is some limitation on how large D can be. In the case of a buck converter where the high side transistor is a PMOS, the duty cycle can be increased all the way to 100%, since it is sufficient to simply pull the gate of the PMOS down to ground. However, PMOS output devices are larger than NMOS devices of comparable performance, so it is more expensive to use PMOS devices.

If an NMOS device is used, a method has to be found to drive the gate to a higher voltage than the source. In the prior art device shown in FIG. 1, this is done using a "bootstrap" capacitor and a diode or synchronous diode. The prior art circuit of FIG. 1 includes high side driver 20; low side driver 22; high side switch 24 (transistor); low side switch 26 (transistor); diode 28; bootstrap capacitor 30; inductor 32; output capacitance 34; output load resistance 36; and input voltage Vin. The disadvantage of this prior art system is that the bootstrap capacitor 30 depends on the converter maintaining less than 100% duty-cycle in order to recharge the bootstrap capacitor 30. Consequently, it is not possible to run the part down to as low an input supply as would be possible with 100% duty cycle.

A high power charge pump is used in some prior art devices to supply the entire high side gate-drive whether the device is running 100% duty cycle or not. However, the high power charge pump is very expensive in silicon area and uses several additional external capacitors. This is more costly in the switching converter IC and externally in the system.

In another prior art solution, an additional supply rail is used to power the NMOS drive. However, an additional rail is not available in many cases.

SUMMARY OF THE INVENTION

A switch mode converter uses the bootstrap capacitor to operate all the way to 100% duty cycle by adding only a very small amount of low-area extra circuitry. The additional circuitry includes a charge pump and a duty cycle detect device. When the duty cycle detect device detects that the converter is attempting to operate in 100% duty cycle, the charge pump provides additional charge to the bootstrap capacitor to ensure that the 100% duty cycle is maintained. Performance into dropout (when the input supply is actually lower than the desired output) is improved. A significant advantage in some applications (notably battery operation) is provided.

DETAILED DESCRIPTION OF PREFERRED EMBODIMENTS

The present invention allows a switch mode converter using the bootstrap capacitor to operate all the way to 100% duty cycle by adding only a very small amount of low-area extra circuitry. Running to 100% rather than 90% allows a part regulating an output voltage at 3.3V to run down to an input supply some 300 mV lower. A significant advantage in some applications (notably battery operation) is provided.

Figure 1:
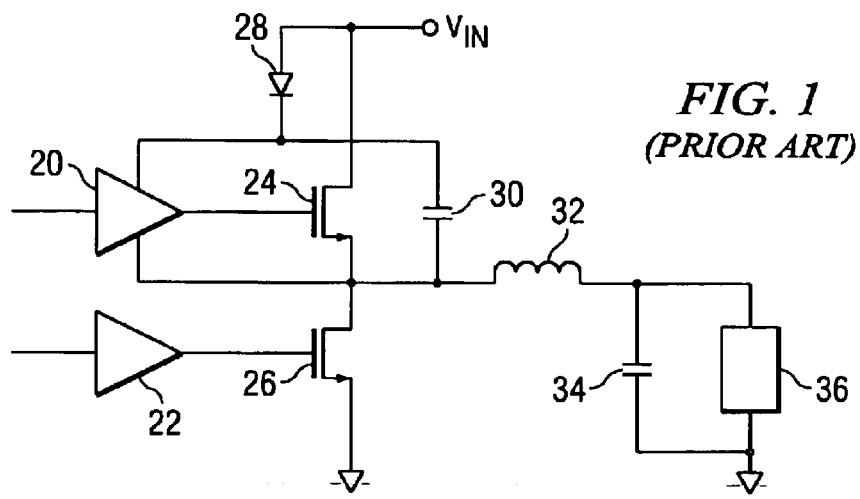
FIG. 1 is a schematic circuit diagram of a prior art switch mode converter with a bootstrap capacitor.
Figure 2:
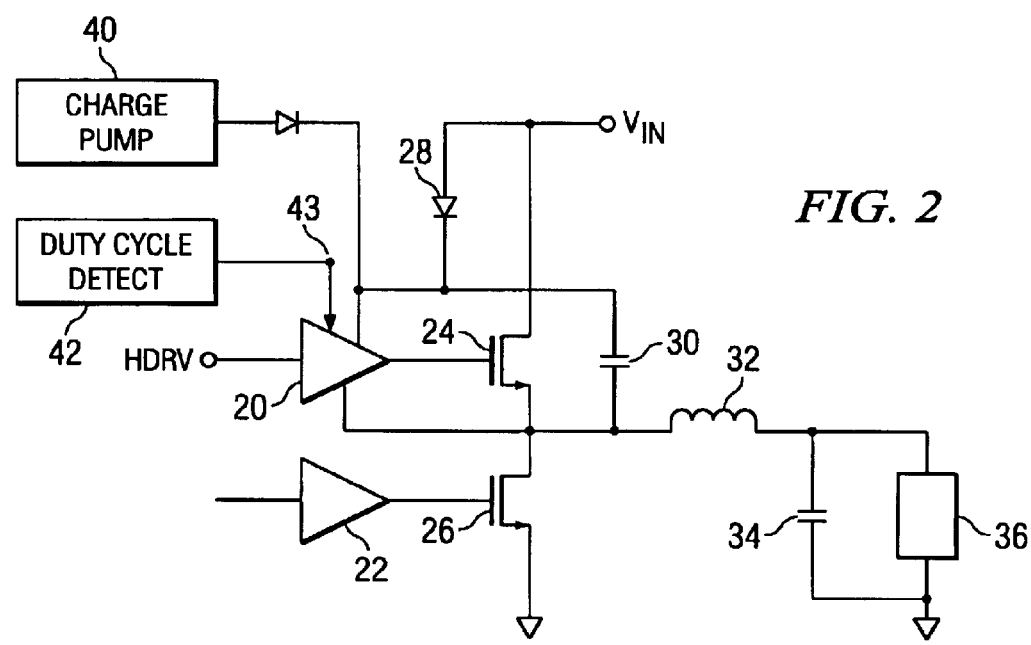
FIG. 2 is a schematic circuit diagram of a first preferred embodiment switch mode converter that allows 100% duty cycle.

A first preferred embodiment is shown in FIG. 2. The circuit of FIG. 2 adds a charge pump 40 and duty cycle detect circuit 42 to the circuit of FIG. 1. The duty cycle detect circuit detects when the high side switch 24 has been on for an unusually long time. There are several ways the duty cycle detect circuit 42 can be implemented, such as: 1) have a one-shot timer that detects unusually long "on-time"; 2) if the converter normally operates "fixed-frequency", simply detect that the FET has been on continuously for more than one entire cycle of the switching converter; 3) detect that the "bootstrap capacitor" is not being fully restored to the desired voltage each cycle, as would happen if the on time were too short for this restoration to complete; and 4) detect that the error signal in the switching converter is beyond some threshold.

Figure 3:
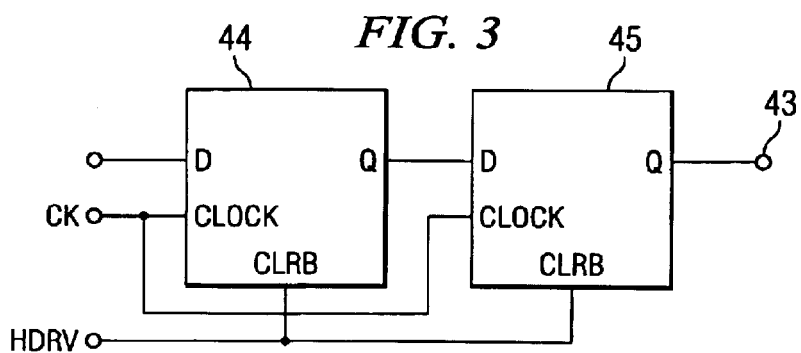
FIG. 3 is a circuit diagram of a first example duty cycle detect device for the circuit of FIG.2.

A first example duty cycle detect circuit is shown in FIG. 3. The circuit of FIG. 3 includes: flip flops 44 and 45; input node HDRV which corresponds with node HDRV in FIG. 2; clock signal node CK; and output node 43 which corresponds with node 43 in FIG. 2. During operation, a logic ONE is applied to the D input node of flip flop 44.

Figure 4:
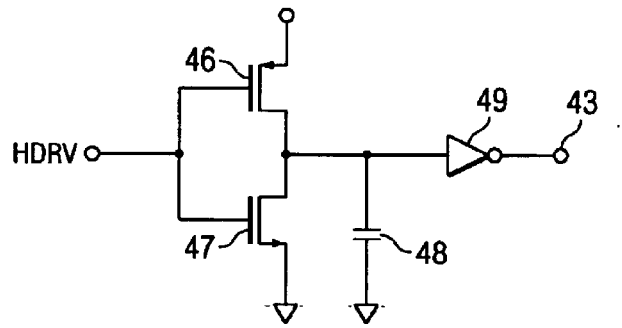
FIG. 4 is a circuit diagram of a second example duty cycle detect device for the circuit of FIG. 2.

A second example duty cycle detect circuit is shown in FIG. 4. The circuit of FIG. 4 includes: PMOS transistor 46; NMOS transistor 47; capacitor 48; inverter 49; input node HDRV; and output node 43. The channel width-to-length ratio of transistor 46 is much larger than that of transistor 47. Node 43 provides a HIGH signal when 100% duty cycle is detected.

Once this state has been detected, the high side driver 20 is put into a "low-quiescent" mode, where it will draw very little current from the bootstrap capacitor 30 and very little current from the gate of high side transistor 24. Then the charge pump 40 supplies leakage current losses from the gate of the high side NMOS 24 and the bootstrap capacitor 30. The current from the charge pump 40 will typically be of the order of a microamp or so. Such a current can be provided by an auxiliary charge-pump, which may already be present in the controller or may be added to the design of the controller using very little silicon area.

Figure 5:
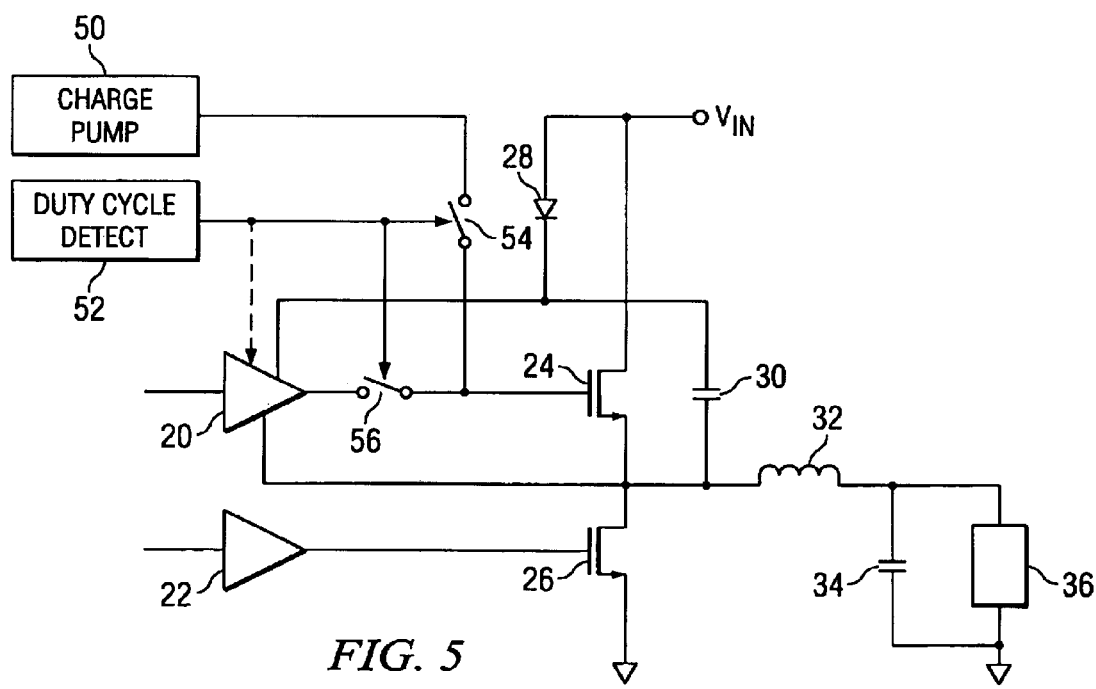
FIG. 5 is a schematic circuit diagram of a second preferred embodiment switch mode converter that allows 100% duty cycle.

A second preferred embodiment is shown in FIG. 5. The circuit of FIG. 5 adds charge pump 50, duty cycle detect device 52, and switches 54 and 56 to the circuit of FIG. 1. Charge pump 50 is connected to the gate of high side transistor 24 when 100% duty cycle is detected, switch 56 is opened, and switch 54 is closed.

The preferred embodiments provide several advantages. Very little additional circuitry is required which provides an advantage in area and cost. In some cases, performance is achieved that previously had only been achieved with PMOS in a larger package with more pins. Performance into dropout (when the input supply, is actually lower than the desired output) is improved. No additional components are required outside of the controller IC.

While this invention has been described with reference to illustrative embodiments, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A switch mode converter circuit comprising:

a high side transistor;

a low side transistor coupled to the high side transistor;

an inductor having a first end coupled to a node between the high side transistor and the low side transistor and a second end coupled to an output node;

a boot capacitor having a first end coupled to the first end of the inductor;

a high side driver coupled to a control node of the high side transistor;

a first diode coupled between a second end of the boot capacitor and an input voltage node;

a charge pump for providing additional charge to the boot capacitor when a duty cycle of the switch mode converter circuit is one hundred percent;

wherein the charge pump is coupled to the control node of the high side transistor;

wherein a first switch is coupled between the charge pump and the control node of the high side transistor; and wherein a second switch is coupled between the high side driver and the control node of the high side transistor.

2. The circuit of claim 1 further comprising a duty cycle detect device for controlling the first switch and the second switch.

3. A switch mode converter circuit comprising:

a high side transistor;

a low side transistor coupled to the high side transistor;

an inductor having a first end coupled to a node between the high side transistor and the low side transistor and a second end coupled to an output node;

a boot capacitor having a first end coupled to the first end of the inductor;

a high side driver coupled to a control node of the high side transistor;

a first diode coupled between a second end of the boot capacitor and an input voltage node;

a charge pump for providing additional charge to the boot capacitor when a duty cycle of the switch mode converter circuit is one hundred percent;

wherein the charge pump is coupled to the second end of the boot capacitor; and a second diode coupled between the charge pump and the second end of the boot capacitor.

4. The circuit of claim 3 wherein the second end of the boot capacitor is coupled to a first supply voltage node of the high side driver.

5. The circuit of claim 4 wherein a second supply voltage node of the high side driver is coupled to the node between the high side transistor and the low side transistor.

6. The circuit of claim 3 further comprising a duty cycle detect device for determining when the duty cycle in one hundred percent.

* * * * *